(12) United States Patent
Terashima et al.

(10) Patent No.: US 6,467,310 B2
(45) Date of Patent: *Oct. 22, 2002

(54) METHOD FOR PRODUCING OPTICAL FIBER BASE MATERIAL INGOT BY GRINDING WHILE CORE PORTION CENTRAL AXIS IS BROUGHT INTO LINE WITH ROTATIONAL AXIS OF GRINDING MACHINE

(75) Inventors: Masami Terashima; Tadakatsu Shimada; Hideo Hirasawa, all of Gunma-ken (JP)

(73) Assignee: Shin Etsu Chemical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,413

(22) Filed: Jul. 28, 1999

(65) Prior Publication Data

US 2002/0059815 A1 May 23, 2002

(30) Foreign Application Priority Data

Jul. 29, 1998 (JP) ............................................ 10-228676

(51) Int. Cl.[7] .............................................. C03B 27/037
(52) U.S. Cl. .............................. 65/382; 65/61; 451/41; 451/51
(58) Field of Search ....................... 65/61, 382; 451/41, 451/51

(56) References Cited

U.S. PATENT DOCUMENTS

| 3,868,170 A | * | 2/1975 | DeLuca | 385/123 |
| 4,599,098 A | * | 7/1986 | Sarkar | 65/421 |
| 4,911,743 A | * | 3/1990 | Bagby | 65/30.13 |
| 5,192,350 A | * | 3/1993 | Le Sergent | 65/61 |

FOREIGN PATENT DOCUMENTS

| EP | 0484035 | 5/1992 |
| JP | 62-212240 | 9/1987 |
| JP | 63-139024 | 6/1988 |
| JP | 2212328 | 8/1990 |

OTHER PUBLICATIONS

An English language abstract of JP 10059739 to Hideo, Mar. 3, 1998.*

* cited by examiner

Primary Examiner—John Hoffmann
(74) Attorney, Agent, or Firm—Hogan & Hartson, LLP

(57) ABSTRACT

There are disclosed a method for producing an optical fiber base material ingot comprising depositing a soot on a starting core member, and subjecting the soot to dehydration, vitrification by sintering, and then cylindrical grinding, wherein the cylindrical grinding is performed while a core portion central axis is brought into line with a rotation axis of cylindrical grinding machine, and an optical fiber base material ingot produced by the method. According to the present invention, there are provided an optical fiber base material ingot having excellent ingot roundness and excellent core portion eccentricity, and a production method capable of producing the optical fiber base material ingot in a short period of time.

2 Claims, 2 Drawing Sheets

METHOD FOR PRODUCING OPTICAL FIBER BASE MATERIAL INGOT BY GRINDING WHILE CORE PORTION CENTRAL AXIS IS BROUGHT INTO LINE WITH ROTATIONAL AXIS OF GRINDING MACHINE

BACKGROUND OF THE INVENTION

1. Field of the Invention

The present invention relates to an optical fiber base material ingot having excellent ingot roundness and core portion eccentricity, and a production method which can produce the optical fiber base material ingot in a short period of time.

2. Description of the Related Art

An optical fiber base material ingot is produced through steps of dehydration, sintering and the like, for example, after depositing a clad portion on a surface of starting core member through the OVD (outside chemical vapor deposition). As generally known methods for improving production rate of the step of depositing a soot on a surface of starting core member in the OVD method, there can be mentioned use of a larger diameter of burner for supplying a material gas, which is hydrolyzed in oxyhydrogen flame and deposited as glass microparticles, use of an increased number of such a burner, and the like. When a larger diameter of material gas supplying burner is used for improving the production rate, there arises a problem of extremely bad deposition efficiency of the soot in an early stage of the soot deposition on the surface of starting core member. Furthermore, when a plurality of burners having a larger diameter are used, there arises a problem that intended good deposition efficiency cannot be obtained due to interference of flame. On the other hand, when an increased number of burners is used, irregularities are formed on the surface of the deposited soot because there are a plurality of burners. In particular, when the deposition is performed at a high speed by increasing the amount of material gas, that phenomenon disadvantageously appears notably. Consequently, an optical fiber obtained does not possess good optical characteristics, in particular, desired cutoff wavelength or desired scattering characteristics in a single mode optical fiber. As a method for removing the irregularities on the base material ingot surface, grinding of the base material ingot surface has been known (Japanese Patent Unexamined Publication [KOKAI] No. 2-212328). However, the conventional grinding process has disadvantageously required a long period of time. In addition, though the surface irregularities are removed, the core portion of base material ingot obtained by this method is not necessarily positioned in the center portion of the base material ingot. As a result, the obtained optical fiber causes problems concerning optical characteristics, such as splicing loss in the fiber fusion connection process when laying optical fiber cables.

SUMMARY OF THE PRESENT INVENTION

The present invention has been completed in view of the aforementioned problems, and its major object is to provide an optical fiber base material ingot having excellent ingot roundness and core portion eccentricity, and a method capable of producing such an optical fiber base material ingot in a short period of time. The present invention has been completed in order to achieve the aforementioned object, and provides a method for producing an optical fiber base material ingot comprising depositing a soot on a starting core member, and subjecting the soot to dehydration, vitrification by sintering, and then cylindrical grinding, characterized in that the cylindrical grinding is performed while a core portion central axis is brought into line with a rotation axis of cylindrical grinding machine.

By performing the cylindrical grinding while the core portion central axis is brought into line with the rotation axis of cylindrical grinding machine as in the aforementioned method, the obtained ingot can have excellent roundness without irregularities and, in addition, it becomes possible to exactly position the core portion at the center of the ingot. An optical fiber obtained from the ingot was found to have good optical characteristics, in particular, a desired cutoff wavelength and scattering characteristics and the like in a single mode optical fiber as a result of the above characteristic. In addition, it was also found that the conventional problems concerning optical characteristics, such as splicing loss in the fiber fusion connection process when laying optical fiber cables, can be solved. In the above method, it is desirable that the core portion central axis is brought into line with the rotation axis of cylindrical grinding machine by detecting the position of core portion. By detecting the position of the core portion, the core portion central axis can accurately and easily be brought into line with the rotation axis of cylindrical grinding machine. Further, it is desirable that, in the cylindrical grinding, finishing grinding is performed after at least rough grinding is performed. By doing so, an extremely smooth ingot surface can be obtained within a short period of time.

Furthermore, by performing the cylindrical grinding through multi-edge grinding, an extremely smooth ingot surface can be obtained within a further shortened period of time. An optical fiber base material ingot of the present invention obtained by the aforementioned method has an extremely smooth ingot surface. As a result, an optical fiber obtained from the optical fiber base material ingot of the present invention has good optical characteristics, in particular, a desired cutoff wavelength, scattering characteristics and the like in a single mode optical fiber. In addition, the optical fiber base material ingot of the present invention has excellent core portion eccentricity. Consequently, an optical fiber obtained from the base material can solve the conventionally observed problems concerning optical characteristics, such as splicing loss in the fiber fusion connection process when laying optical fiber cables. The method for producing an optical fiber base material ingot of the present invention requires extremely shorter production time compared with conventional production methods. Moreover, the optical fiber base material ingot produced by the method for producing an optical fiber base material ingot of the present invention correctly has a desired core/clad diameter ratio, and an extremely smooth ingot surface. Consequently, the obtained optical fiber has good optical characteristics, especially a desired cutoff wavelength and desired scattering characteristics in a single mode optical fiber. Furthermore, the optical fiber base material ingot of the present invention has a core correctly located at the ingot center. As a result, an optical fiber obtained from it is free from the problems concerning optical characteristics, such as splicing loss observed in fusion connection operation when laying the optical fiber cable.

DESCRIPTION OF THE INVENTION AND EMBODIMENTS

Embodiments of the present invention will be explained hereinafter with reference to the appended drawings. However, the present invention is not limited to them.

Figure 1:
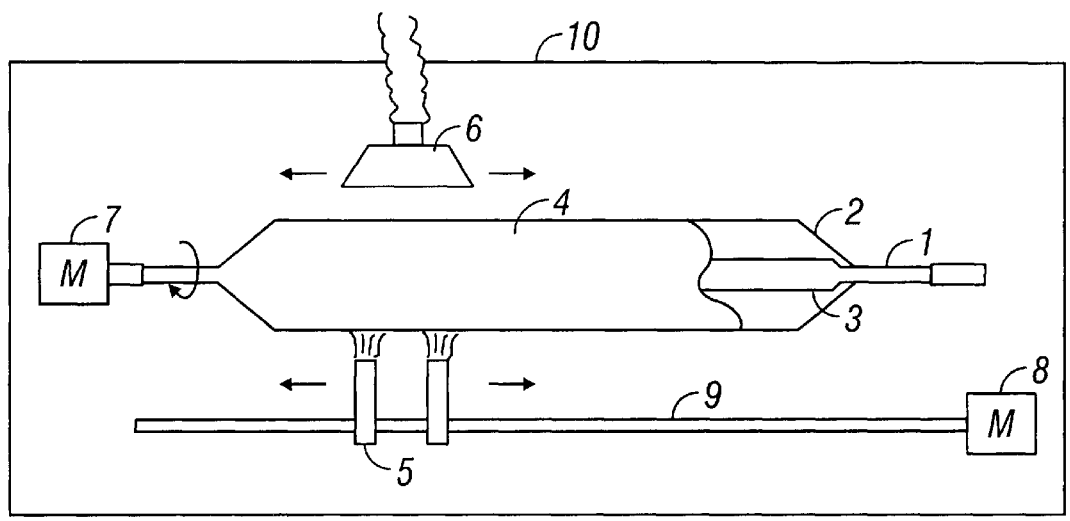
FIG. 1 is a schematic cross-sectional side view of a soot deposition apparatus.
Figure 2:
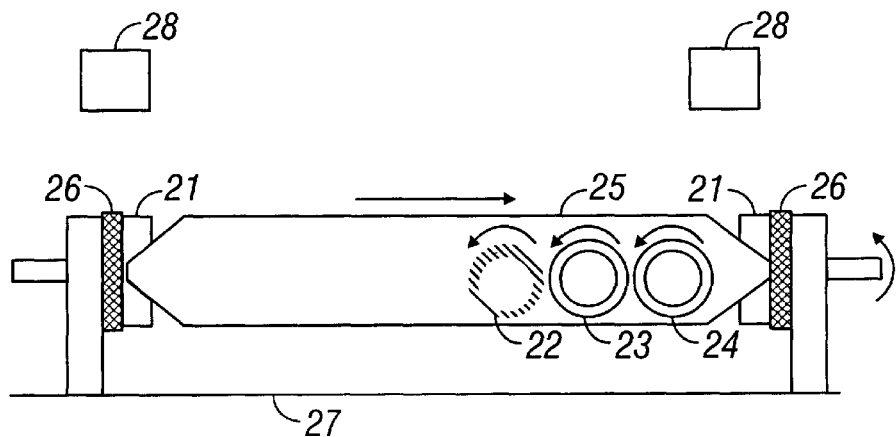
FIG. 2 is a schematic side view of a cylindrical grinding apparatus used for multi-edge grinding.
Figure 3:
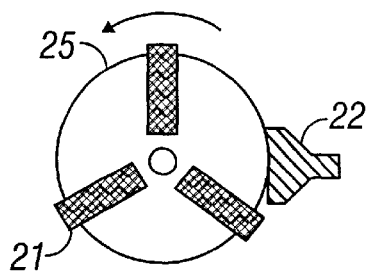
FIG. 3 is a schematic front view of the cylindrical grinding apparatus.
Figure 4:
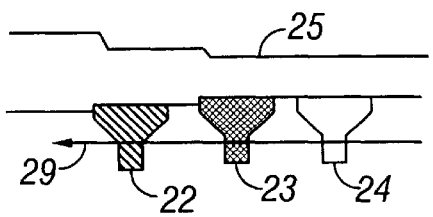
FIG. 4 is an enlarged schematic cross-sectional side view of optical fiber base material ingot grinding part.

FIG. 1 is a schematic cross-sectional side view of a soot deposition apparatus, FIG. 2 is a schematic side view of a cylindrical grinding apparatus for multi-edge grinding, FIG. 3 is a schematic front view of the cylindrical grinding apparatus, and FIG. 4 is an enlarged schematic cross-sectional side view of the base material ingot grinding part. In the method for producing an optical fiber base material ingot of the present invention, a soot 2 is first deposited on a circumferential surface of a starting core member 3.

The deposition of the soot 2 is performed by, although the method is not particularly limited, for example, the OVD (outside chemical vapor deposition) method as shown in FIG. 1. That is, the deposition is performed by applying a material gas, e.g., $SiCl_4$, gas for hydrolysis and the like from burners 5 onto the starting core member 3, which is mounted on a rotation driving part 7 and rotated, wherein the material gas is hydrolyzed in oxyhydrogen flame. These gases are preferably supplied in a gradually increasing amount considering adhesion of the soot. When the gases from the burners 5 are jetted onto the member, the burners 5 are slid in a reciprocating manner along a direction parallel to the longitudinal direction of the starting core member 3 as conventionally performed. As a result of this operation, the product from the hydrolysis of the material gas in oxyhydrogen flame is deposited as the soot 2 on the circumferential surface of the core member 3. According to the present invention, because the cylindrical grinding is performed as will be explained hereinafter, the production rate can be increased by using at least two of the burners 5 having a larger diameter.

In the method for producing the optical fiber base material ingot of the present invention, a porous base material obtained as described above is subsequently subjected to dehydration and vitrification by sintering to give an optical fiber base material ingot. The dehydration and sintering may be performed by, for example, introducing the core member with the deposited soot into a sintering furnace. Then, the cylindrical grinding of the aforementioned optical fiber base material ingot surface is carried out to obtain a smooth surface. What is important for performing the cylindrical grinding is to perform it so that, after the grinding, the core portion should be located at the center of the optical fiber base material ingot as for the cross-sectional structure of the optical fiber base material ingot. If the core portion deviates toward one side of the optical fiber base material ingot, problems, such as splicing loss in the fiber fusion connection operation, will arise when laying the obtained optical fiber cables. Therefore, the cylindrical grinding of the ingot surface is performed while the core portion central axis of the dehydrated and sintered ingot is brought into line with the rotation axis of the cylindrical grinding machine.

While any method can be used for bringing the core portion central axis of the dehydrated and sintered optical fiber base material ingot into line with the rotation axis of the cylindrical grinding machine, it is preferably achieved by detecting the position of the core portion, which is a method capable of realizing it simply and correctly. That is, for example, the dehydrated and sintered optical fiber base material ingot is first attached to a chuck 21 of cylindrical grinding machine 27. Subsequently, the core portion position is determined at the both ends of the ingot by an optical measuring instrument, while rotating the ingot. Then, after the position of the center of the core portion is determined correctly, the chuck 21 is moved so that the rotation center of chuck support 26 should correctly coincide with the determined center position. The aforementioned measurement by an optical measuring instrument can be performed by, for example, using a measuring instrument provided with deflection glass or the like while rotating the ingot. In the aforementioned cylindrical grinding, finishing grinding is preferably performed after at least rough grinding is performed. By doing so, the grinding time can be shortened, and an extremely smooth optical fiber base material ingot can be obtained. In order to further shorten the grinding time, the cylindrical grinding may be performed by multi-edge grinding. That is, various grinding wheels are mounted on the cylindrical grinding machine, and simultaneous grinding is performed with these wheels until a desired core/clad ratio is obtained. In such an operation, a coarse front wheel enables deep grinding first, and then a fine grain rear wheel flattens the ground surface, so that rough grinding and fine grinding should be realized in a single operation.

While an optical fiber base material ingot having a smooth surface and a desired core/clad ratio may be obtained by the aforementioned multi-edge grinding, it is preferable to perform finishing grinding for obtaining an optical fiber base material ingot having a further smooth surface and a more accurate core/clad ratio. That is, the position of the core portion of the optical fiber base material ingot which has been roughly ground as described above is detected again as explained above, the core portion central axis is correctly homologized with the rotation axis of the cylindrical grinding machine by fine adjustment, and the cylindrical grinding is performed once again. In the finishing grinding, the cylindrical grinding may not be based on the aforementioned multi-edge grinding, and may be based on usual grinding with a single edge.

The finishing grinding may be performed once, or may be repeated a plurality of times as required. Thus, according to the production method of the present invention, a production time required for producing an optical fiber base material ingot can be markedly shortened compared with the conventional production time. The optical fiber base material ingot of the present invention can be made into an optical fiber preform by stretching in a conventional manner, and subsequently made into an optical fiber by wire drawing.

As described above, FIG. 1 illustrates the manufacture of a porous base material by depositing soot 2 onto the starting core member 3 as the core member 3 is rotated by rotation of the driving part 7. Subsequent dehydration and vitrification of the porous base material produces an optical fiber base material ingot. The ingot is then ground, as illustrated in FIGS. 2 and 3, eventually producing an optical fiber. In accordance with the invention, the central axis of the core portion or member 3 is brought into alignment with the axis of rotation of the cylindrical grinding apparatus shown in FIG. 2, as grinding is performed. This is illustrated iL FIGS. 5A and 5B. Optical measuring instruments, such as the instrument 28 shown in FIG. 2, are used to sense the position of the core member 3 of the ingot. Adjustment of the chuck 21 using the chuck support 26 is then performed, at each end of the ingot as necessary, to bring the central axis of the core member 3 into alignment with the axis of rotation. As a result, when grinding is completed, the central axis of the core member coincides with the axis of rotation, and the core portion or member of the ingot is positioned at the center portion of the ingot.

Figure 5A:
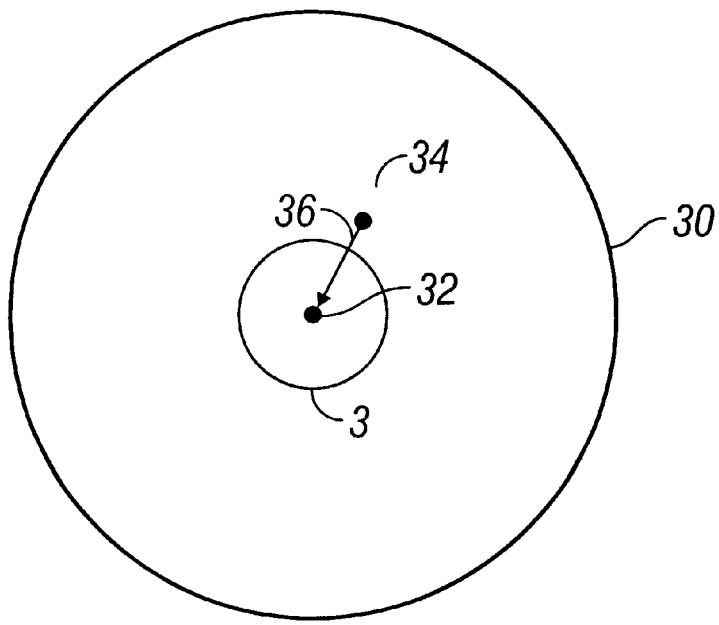
FIG. 5A is a cross-sectional view of the base material ingot of FIG. 1 prior to bringing of the central axis of the core portion into alignment with the axis of rotation with grinding, according to the invention.
Figure 5B:
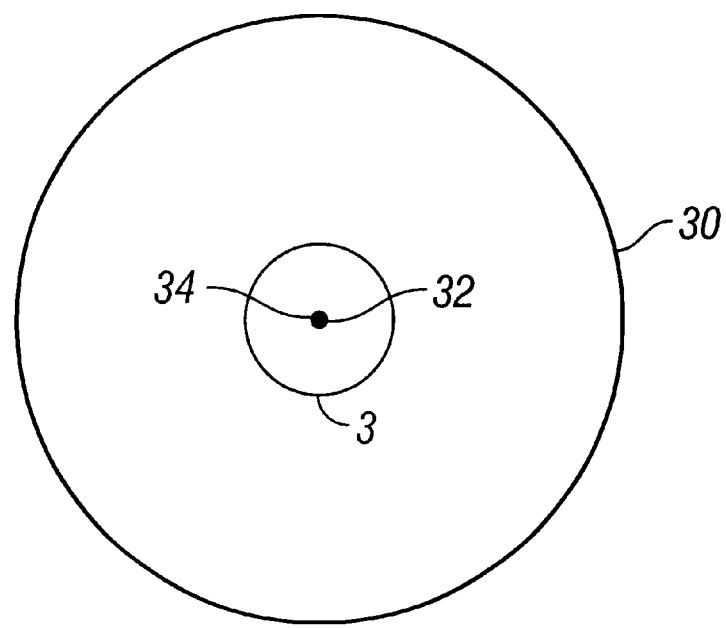
FIG. 5B is a cross-sectional view of the base material ingot following alignment of the axes and grinding of the ingot.

Referring to FIG. 5A, the ingot 30 is shown as it is formed in accordance with the process illustrated in FIG. 1, before axis alignment and grinding according to the invention. Typically, the core member 3 is offset from the center of the ingot 30, such that a central axis 32 of the core member 3 is displaced from an axis of rotation 34 of the grinding equipment which lies at the center of the ingot 30. In accordance with the invention, grinding of the ingot 30 is performed while the central axis 32 of the core member 3 is brought into alignment with the axis of rotation 34, as illustrated by an arrow 36 in FIG. 5A. The optical measuring instrument 28 is used to sense the position of the core member 3, and the chuck 21 is adjusted using the chuck support 26, as necessary to bring the central axis 82 of the core member 3 into alignment with the axis of rotation 34. When grinding is completed, as illustrated in FIG. 5B, the central axis 82 of the core member 3 coincides with the axis of rotation 34. As previously described, this is important to the optical characteristic of the optical fiber being produced. As shown in FIG. 5B, the diameter of the ingot 30 is reduced, when compared with FIG. 5A, as a result of the grinding process.

EXAMPLES

The present invention will be explained with reference to the following example and comparative example. (Example) As a starting core member 3, quartz glass for single mode optical fibers, which had an outer diameter of 25 mm ø and a length of 1200 mm, was used. This was welded with a dummy quartz bar, attached to a revolution driving part 7 in a closed type reactor 10, and rotated at 40 rpm. Subsequently, oxygen gas of 75 L/min, hydrogen gas of 150 L/min, oxygen gas of 9 L/min as a carrier gas, and $SiCl_4$ of 40 g/min as a material gas were introduced into the multi-pipe oxyhydrogen flame burners 5 having an opening diameter of 28 mm ø from a material supplying apparatus not shown. These burners 5 were reciprocated on a burner guiding mechanism 9 at a speed of 150 mm/min within a length of 1600 mm by a motor 8, so that glass microparticles formed from hydrolysis of $SiCl_4$ in flame should be deposited on the core member 3. The exhaust was ejected from an ejection hood 6. As the deposition proceeded, the amount of the material gas was further increased to obtain a deposited soot having an outer diameter of 240 mm ø after 24 hours. At the end of the deposition, oxygen gas of 180 L/min, hydrogen gas of 360 L/min, oxygen gas of 20 L/min as a carrier gas, and $SiCl_4$ of 100 g/min as a material gas were supplied to the burners 5. The average deposition rate was 31 g/min. It was confirmed that spiral irregularities were present on the obtained soot surface. This soot deposition product was put into a sintering furnace, and subjected to dehydration and vitrification by sintering to obtain a transparent optical fiber base material ingot having an outer diameter of 135 mm ø. On its surface, the spiral irregularities remained. The maximum depth of the irregularities was 1.05 mm.

Then, the aforementioned optical fiber base material ingot was attached to the chuck 21 of the cylindrical grinding machine 27. The position of the core portion of the optical fiber base material ingot was determined at its both ends using the optical measuring instrument 28 provided with deflection glass while rotating the optical fiber base material ingot. The chuck 21 was moved so that the center of the core portion should be brought into line with the rotation center of the chuck support part 26 to set the optical fiber base material ingot. A diamond wheel 22 used for the grinding was one having roughness of #60, and its wheel position was set so that the grinding depth should be 0.75 mm. A diamond wheel 23 was one having roughness of #140, and its wheel position was set so that the grinding depth should be deeper by 0.3 mm than the cut surface of the diamond wheel 22. A diamond wheel 24 was one having roughness of #600, and its wheel position was set so that the grinding depth should be deeper by 0.05 mm than the cut surface of the diamond wheel 23. The grinding was performed once at an optical fiber base material ingot feeding speed of 50 mm/min while the grinding part was cooled with water. Movement of the diamond wheels 22, 23 and 24 in the direction of an arrow 29 shown in FIG. 4 provides rough grinding followed by finishing grinding.

As a result, the optical fiber base material ingot was finished with a smooth surface, and the core portion could also be measured definitely. To determine core/clad diameter ratio and eccentricity of the core, measurement was performed using an optical measuring instrument 28 provided with deflection glass while rotating the optical fiber base material ingot. In order to finely adjust the rotation center of the core, and adjust the core/clad diameter ratio, the finishing grinding was performed once for a grinding depth of 0.05 mm at an optical fiber base material ingot feeding speed of 50 mm/min by using only the diamond wheel 24 having roughness of #600 to finish the cylindrical grinding. The time required for the cylindrical grinding was about 120 minutes, and the production time including that for the cylindrical grinding could be shortened to about ½ of the conventional one. Eccentricity of the obtained optical fiber base material ingot of the present invention was measured by the method explained below. The result is shown in Table 1. As shown in Table 1, it was found that the core portion was correctly located at the center. The surface of the obtained optical fiber base material ingot was extremely smooth. Further, the obtained optical fiber base material ingot was stretched to 45 mm ø in an electric furnace to form an optical fiber preform, which was then spun by a drawing machine to give an optical fiber having an outer diameter of 125 $\mu$. When splicing loss and fluctuation λc along the longitudinal direction of this optical fiber were measured by the methods described hereinafter, good results were obtained as shown in Table 1.

(Comparative Example)

A soot deposited in the same manner as in the example was put into a sintering furnace, dehydrated and vitrified by sintering. Though a transparent base material ingot for optical fibers was obtained, spiral irregularities remained on its surface. The maximum depth of the irregularities was 1.15 mm. Core portion eccentricity of this optical fiber base material ingot was measured by the method described below. The result is shown in Table 1. As shown in Table 1, it was found that the core portion considerably deviated from the center line of the base material ingot for optical fibers. Further, the obtained base material ingot for optical fibers was stretched to 45 mm ø in an electric furnace to form an optical fiber preform, which was then spun by a drawing machine to give an optical fiber having an outer diameter of 125 μ. When splicing loss and fluctuation λc along the longitudinal direction of this optical fiber were measured by the method described hereinafter, it showed large splicing loss in fusion connection of the fibers due to the center deviation and large fluctuation as shown in Table 1. The methods for measuring splicing loss, core portion eccentricity, and fluctuation range λc will be explained below. (Method for measuring splicing loss) Splicing loss was measured by OTDR.
(Method for measuring core portion eccentricity) Core portion eccentricity was measured by a fiber structure analyzer.
(Method for measuring longitudinal fluctuation range λc of base material ingot for optical fibers)

Longitudinal fluctuation range λc of base material ingot for optical fibers was measured by a λc measurement apparatus. The measuring method was according to ITU-T G650.

TABLE 1

| Example | Measurement Item | | |
|---|---|---|---|
| | Splicing loss (dB) | Eccentricity (%) | Longitudinal fluctuation range λC (μm) |
| Example | 0.03 | 0.20 | 0.01 |
| Comparative Example | 0.16 | 1.43 | 0.05 |

The present invention is not limited to the embodiments mentioned above. The above-described embodiments are mere examples, and those having the substantially same structure as that described in the appended claims and providing the similar functions and advantages are included in the scope of the present invention.

What is claimed is:

1. A method for producing an optical fiber base material ingot comprising depositing a soot on a starting core member having a central axis and subjecting the soot to dehydration and vitrification by sintering to form an ingot, mounting the ingot in a cylindrical grinding machine having a rotation axis so that the central axis of the core member is generally in line with the rotation axis of the grinding machine, and grinding the ingot in the grinding machine, the mounting of the ingot in a cylindrical grinding machine including the steps of initially mounting the ingot in the cylindrical grinding machine so that the central axis of the core member is generally in line with the rotation axis of the grinding machine before any grinding of the ingot is performed, performing a rough grinding of the ingot, adjusting the position of the ingot within the grinding machine so that the central axis of the core member is again generally in line with the rotation axis of the grinding machine, and subsequently carrying out further grinding of the ingot.

2. A method for producing an optical fiber base material ingot comprising depositing a soot on a starting core member having a central axis and subjecting the soot to dehydration and vitrification by sintering to form an ingot, mounting the ingot in a cylindrical grinding machine having a rotation axis so that the central axis of the core member is generally in line with the rotation axis of the grinding machine, and grinding the ingot in the grinding machine, the cylindrical grinding machine including a chuck and an optical measuring instrument, and the mounting of the ingot in a cylindrical grinding machine having a rotation axis so that the central axis of the core member is generally in line with the rotation axis of the grinding machine including the steps of initially attaching the ingot to the chuck, determining the position of the central axis of the core member using the optical measuring instrument while rotating the ingot in the cylindrical grinding machine, and adjusting the chuck so that the central axis of the core member is generally in line with the rotation axis of the grinding machine.

* * * * *